US012118387B2

(12) United States Patent
Javeri et al.

(10) Patent No.: US 12,118,387 B2
(45) Date of Patent: Oct. 15, 2024

(54) QUERY AND UPDATE OF PROCESSOR BOOST INFORMATION

(71) Applicant: INTERNATIONAL BUSINESS MACHINES CORPORATION, Armonk, NY (US)

(72) Inventors: Omkar Ulhas Javeri, Poughkeepsie, NY (US); David Harold Surman, Milton, NY (US); Seth E. Lederer, Staatsburg, NY (US); Peter Jeremy Relson, Ulster Park, NY (US); Jonathan D. Bradbury, Poughkeepsie, NY (US); Hunter J. Kauffman, Poughkeepsie, NY (US); Martin Stock, Sindelfingen (DE); Brent J Boisvert, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 17/395,112

(22) Filed: Aug. 5, 2021

(65) Prior Publication Data
US 2023/0043202 A1    Feb. 9, 2023

(51) Int. Cl.
*G06F 9/48* (2006.01)
*G06F 9/445* (2018.01)
*G06F 9/50* (2006.01)

(52) U.S. Cl.
CPC ........ *G06F 9/4887* (2013.01); *G06F 9/44505* (2013.01); *G06F 9/5055* (2013.01);
(Continued)

(58) Field of Classification Search
None
See application file for complete search history.

(56) References Cited

U.S. PATENT DOCUMENTS

| 8,555,288 B2 | 10/2013 | Brown et al. |
| 9,600,345 B1 | 3/2017 | Cropper et al. |

(Continued)

FOREIGN PATENT DOCUMENTS

| CN | 104380246 A | 2/2015 |
| TW | I639090 B | 10/2018 |

OTHER PUBLICATIONS

IBM, "z/Architecture—Principles of Operation," IBM Publication No. SA22-7832-12, Thirteenth Edition, Sep. 2019, pp. 1-2000.

(Continued)

*Primary Examiner* — Abu Zar Ghaffari
(74) *Attorney, Agent, or Firm* — Edward J. Wixted, III, Esq.; Blanche E. Schiller, Esq.; Heslin Rothenberg Farley & Mesiti P.C.

(57) ABSTRACT

A query operation is performed to obtain information for a select entity of a computing environment. The information includes boost information of one or more boost features currently available for the select entity. The one or more boost features are to be used to temporarily adjust one or more processing attributes of the select entity. The boost information obtained from performing the query operation is provided in an accessible location to be used to perform one or more actions to facilitate processing in the computing environment.

25 Claims, 16 Drawing Sheets

(52) U.S. Cl.
CPC ...... *G06F 9/5077* (2013.01); *G06F 2209/485* (2013.01); *G06F 2209/501* (2013.01)

(56) References Cited

U.S. PATENT DOCUMENTS

| | | | |
|---|---|---|---|
| 10,810,043 | B2 | 10/2020 | Bahramshahry et al. |
| 10,884,818 | B2 | 1/2021 | Sutton et al. |
| 2002/0073019 | A1* | 6/2002 | Deaton ............... G06Q 20/20 705/38 |
| 2005/0262504 | A1* | 11/2005 | Esfahany ............. G06F 9/5077 718/1 |
| 2006/0143287 | A1* | 6/2006 | Tanaka ................ H04L 41/042 709/223 |
| 2012/0159506 | A1* | 6/2012 | Barham ............... G06F 9/5044 718/104 |
| 2014/0059542 | A1 | 2/2014 | Ashok et al. |
| 2014/0229943 | A1* | 8/2014 | Tian ................... G06F 9/45533 718/1 |
| 2015/0135185 | A1* | 5/2015 | Sirota ................. H04L 67/10 718/103 |
| 2015/0213454 | A1* | 7/2015 | Vedula ............... G06Q 30/016 705/304 |
| 2015/0339143 | A1* | 11/2015 | Shih ................... G06F 9/5077 718/1 |
| 2016/0139948 | A1* | 5/2016 | Beveridge ............ H04L 43/08 718/1 |
| 2016/0242111 | A1* | 8/2016 | Wakabayashi ........ H04W 4/70 |
| 2017/0070933 | A1* | 3/2017 | Hagiwara ........... H04L 12/2809 |
| 2017/0195245 | A1* | 7/2017 | Bhatia ................ H04L 43/16 |
| 2018/0136942 | A1 | 5/2018 | Chandrasekhar et al. |
| 2019/0354390 | A1* | 11/2019 | Gill ................... G06F 11/0793 |
| 2020/0274923 | A1* | 8/2020 | Jujjuri ................ G06F 11/3433 |
| 2020/0278892 | A1* | 9/2020 | Nainar ................ H04L 67/10 |
| 2021/0064470 | A1* | 3/2021 | LeCrone ............. G06F 11/1469 |
| 2021/0191769 | A1* | 6/2021 | Eschinger ........... G06F 9/5077 |
| 2022/0237024 | A1* | 7/2022 | Chen .................. G06F 9/50 |
| 2022/0253689 | A1* | 8/2022 | Lange ................. G06N 3/08 |
| 2022/0327127 | A1* | 10/2022 | Anand ............... G06F 16/24542 |
| 2022/0414492 | A1* | 12/2022 | Jezewski ............. G06N 5/04 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Anonymous, "Efficient Monitoring of Plan Execution CPU Costs in a Database Server," IP.com No. IPCOM000188191D, Sep. 25, 2009, pp. 1-9.

Anonymous, "An Analytic Capacity Planning, Performance And Cost Modeling Technique For Cloud Computing Environments," IP.com No. IPCOM000190621D, Dec. 8, 2009, pp. 1-6.

Anonymous, "System For Taming Capacity Hogging Software and Nagging Notifications Through Human-Centered Job Scheduling and Smart Queuing," IP.com No. IPCOM000211778D, Oct. 18, 2011, pp. 1-3.

Smith, Bryan F., "An Introduction to IBM's pureQuery," Mar. 3, 2011, pp. 1-37.

Smith, Bryan F., "Two for One: Optim Solutions Update and Optimizing DB2 for z/OS Query Performance," Mar. 4, 2011, pp. 1-95.

Kant, Krishna et al., "Server Capacity Planning for Web Traffic Workload," IEEE Transactions on Knowledge and Data Engineering, vol. 11, No. 5, Sep./Oct. 1999, pp. 731-747.

Lascu, Octavian et al., "Introducing IBM Z System Recovery Boost," IBM Redbooks, Nov. 2020, pp. 1-20.

Anonymous, "System Recovery Boost," XP055970400, 2020 (no further date information available), 58 pages.

Lascu, Octavian et al., "IBM z15 (8561) Technical Guide," IBM Redbooks, SG24-8851-00, Aug. 2020, pp. 1-380 (+ cover pages and contents).

Lascu, Octavian et al., "IBM z15 (8561) Technical Guide," IBM Redbooks, SG24-8851-00, Aug. 2020, pp. 381-384.

PCT Notification of Transmittal of the International Search Report and the Written Opinion of the International Searching Authority, PCT/EP2022/071754, Oct. 21, 2022, 9 pages.

EP Response to Rule 161, Application No. 22761119.1, dated Aug. 30, 2024, pp. 1-13.

* cited by examiner

AT COMPLETION     550

$R_{3+1}$ | UNCHANGED IF $R_3 \neq R_1$ |
0      32      63

FIG. 5D

AT COMPLETION     560

$R_1$ | UNCHANGED |
0      32      63

FIG. 5E

AT COMPLETION     580

$R_{1+1}$ | ZEROS | RESPONSE CODE |
0      32      48    582    63

FIG. 5F

READ SCP INFORMATION    800

| OPCODE | /////// | COMMAND CLASS CODE |

| BYTES | FIELD |
|---|---|
| 0-1 | ⋮ |
| ⋮ | ⋮ |
| ... | SRB ADDITIONAL SPEED BOOST MINUTES — 812 |
| ... | SRB ADDITIONAL CAPACITY BOOST MINUTES — 814 |
| .. | DATE THE SRB ADDITIONAL SPEED BOOST MINUTES EXPIRE — 816 |
| .. | DATE THE SRB ADDITIONAL CAPACITY BOOST MINUTES EXPIRE — 818 |

| BYTES | FIELD |
|---|---|
| 0-1 | ⋮ |
| ⋮ | ⋮ |
| ... | NUMBER OF LONG DURATION BOOST CYCLES — 822 |
| ... | TIME PERIOD FOR LONG DURATION BOOST CYCLES (e.g., NUMBER OF DAYS) — 824 |

FIG. 8C

PERFORM A QUERY OPERATION TO OBTAIN INFORMATION FOR A SELECT ENTITY OF THE COMPUTING ENVIRONMENT ~900

THE INFORMATION INCLUDES BOOST INFORMATION OF ONE OR MORE BOOST FEATURES CURRENTLY AVAILABLE FOR THE SELECT ENTITY —902

THE ONE OR MORE BOOST FEATURES TO BE USED TO TEMPORARILY —904 ADJUST ONE OR MORE PROCESSING ATTRIBUTES OF THE SELECT ENTITY

PROVIDE THE BOOST INFORMATION OBTAINED FROM PERFORMING THE QUERY OPERATION IN AN ACCESSIBLE LOCATION TO BE USED TO PERFORM ONE OR MORE ACTIONS TO FACILITATE PROCESSING IN THE COMPUTING ENVIRONMENT ~906

THE SELECT ENTITY INCLUDES A LOGICAL PARTITION OF THE COMPUTING ENVIRONMENT ~908

THE SELECT ENTITY INCLUDES A PROCESSOR OF THE COMPUTING ENVIRONMENT ~910

THE ONE OR MORE BOOST FEATURES INCLUDE, FOR INSTANCE:

A TOTAL AMOUNT OF SPEED BOOST TIME FOR THE SELECT ENTITY AND AN AMOUNT OF SPEED BOOST TIME REMAINING FOR THE SELECT ENTITY ~912

A TOTAL AMOUNT OF CAPACITY BOOST TIME FOR THE SELECT ENTITY AND AN AMOUNT OF CAPACITY BOOST TIME REMAINING FOR THE SELECT ENTITY ~914

A TOTAL AMOUNT OF AVAILABLE BOOST CYCLES FOR THE SELECT ENTITY AND AN AMOUNT OF BOOST CYCLES REMAINING FOR THE SELECT ENTITY —916

A TIME UNTIL REFRESH OF AT LEAST ONE BOOST FEATURE OF THE ONE OR MORE BOOST FEATURES ~918

FIG. 9A

CONFIGURE AT LEAST ONE BOOST FEATURE OF THE COMPUTING ENVIRONMENT PROVIDING AT LEAST ONE LIMIT FOR THE AT LEAST ONE BOOST FEATURE —— 920

THE CONFIGURING THE AT LEAST ONE BOOST FEATURE INCLUDES USING ONE OR MORE ADJUSTED FEATURE AMOUNTS OBTAINED FROM ONE OR MORE FEATURE ON DEMAND STRUCTURES TO CONFIGURE THE AT LEAST ONE BOOST FEATURE —— 922

THE ONE OR MORE FEATURE ON DEMAND STRUCTURES TO OVERRIDE ONE OR MORE BOOST LIMITS IN EFFECT —— 924

A FEATURE ON DEMAND STRUCTURE OF THE ONE OR MORE FEATURE ON DEMAND STRUCTURES PROVIDES AN INDICATION OF AN ADDITIONAL AMOUNT OF A BOOST FEATURE TO BE PURCHASED OR ALLOCATED FOR A SELECT PURPOSE AND AN INDICATION OF AN EXPIRATION PERIOD FOR THE ADDITIONAL AMOUNT —— 926

FIG. 9B

QUERY AND UPDATE OF PROCESSOR BOOST INFORMATION

BACKGROUND

One or more aspects relate, in general, to facilitating processing within a computing environment, and in particular, to improving such processing.

Performance of a computing environment is based, at least in part, on performance of its processors and/or its logical partitions should logical partitioning be supported. Various factors may be used to determine performance, including, for instance, processor speed and capacity. Processor speed measures the number of instructions per second the processor executes, and processor capacity refers to an amount of potential usage of the processor.

In an effort to improve performance of a processor, logical partitions, and/or the computing environment, processor speed and/or capacity may be adjusted. To temporarily increase processor speed and/or capacity, a boost operation is performed. A short duration boost allows for a temporary increase in processor speed and/or capacity (e.g., ability to temporarily use one or more additional existing processors) for a specified amount of time. A long duration boost allows for a temporary increase in processor speed and/or capacity for a specified amount of time that is longer than the specified amount of time for the short duration boost; and a long duration boost cycle includes a set of related long duration boosts, such as an initial program load boost or a shutdown boost.

Since a boost operation is used to improve performance, it is beneficial to facilitate use of boost operations and related processing.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes performing a query operation to obtain information for a select entity of the computing environment. The information includes boost information of one or more boost features currently available for the select entity. The one or more boost features are to be used to temporarily adjust one or more processing attributes of the select entity. The boost information obtained from performing the query operation is provided in an accessible location to be used to perform one or more actions to facilitate processing in the computing environment.

A query operation provides details regarding boost information that may be used to monitor performance and/or to control the consumption of boost time pools (e.g., recovery process boost time pools) and/or boost cycles.

As examples, the select entity includes a logical partition of the computing environment or a processor of the computing environment.

Further, the one or more boost features include, for instance, a total amount of speed boost time for the select entity and an amount of speed boost time remaining for the select entity. In one example, the query operation provides the ability to know how much speed boost time there is for the select entity and/or the amount of speed boost time remaining for the select entity, which provides the ability for monitoring and/or controlling consumption of speed boost.

In one example, the one or more boost features include, for instance, a total amount of capacity boost time for the select entity and an amount of capacity boost time remaining for the select entity. The query operation provides the ability to know how much capacity boost time (e.g., time in which one or more additional existing processors may be available for processing of workload(s)) there is for the select entity and/or the amount of capacity boost time remaining for the select entity, which provides the ability for monitoring and/or controlling consumption of capacity boost.

In one example, the one or more boost features include, for instance, a total amount of available boost cycles for the select entity and an amount of boost cycles remaining for the select entity. As an example, a boost cycle is a number of boosts, e.g., long duration initial program load or shutdown boosts, available over a defined period of time. The query operation provides the ability to know how many boost cycles there are for the select entity and/or the amount of boost cycles remaining for the select entity, which provides the ability for monitoring and/or controlling consumption of boost cycles.

In one example, the one or more boost features include, for instance, a time until refresh of at least one boost feature of the one or more boost features. The query operation provides the ability to know when one or more features of the boost information (e.g., speed boost time, capacity boost time, number of boost cycles) are to be refreshed, which provides the ability for monitoring and/or controlling consumption of, e.g., speed boost and/or capacity boost.

In one example, at least one boost feature of the computing environment is configured. The configuring provides at least one limit for the at least one boost feature. The configuring of one or more boost features improves system performance.

The configuring the at least one boost feature includes using one or more adjusted feature amounts obtained from one or more feature on demand structures to adjust the at least one boost feature. The one or more feature on demand structures are used to override one or more boost limits in effect.

As an example, a feature on demand structure of the one or more feature on demand structures provides an indication of an additional amount of a boost feature to be purchased or allocated for a select purpose and an indication of an expiration period for the additional amount.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 5D depicts one example of contents of the another general register of FIG. 5C at completion of execution of the select function code of the Diagnose instruction, in accordance with one or more aspects of the present invention;

FIG. 5E depicts one example of contents of yet another general register at completion of execution of the select function code of the Diagnose instruction, in accordance with one or more aspects of the present invention:

FIG. 5F depicts one example of contents of the yet another general register of FIG. 5E at completion of execution of the select function code of the Diagnose instruction, in accordance with one or more aspects of the present invention;

FIG. 8A depicts one example of a Read SCP (System Configuration Parameters) Information command, in accordance with one or more aspects of the present invention;

FIGS. 8B-8C depict examples of a system configuration control block of the Read SCP Information command of FIG. 8A, in accordance with one or more aspects of the present invention;

FIGS. 9A-9B depict one example of facilitating processing within a computing environment, in accordance with one or more aspects of the present invention;

DETAILED DESCRIPTION

Figure 1A:
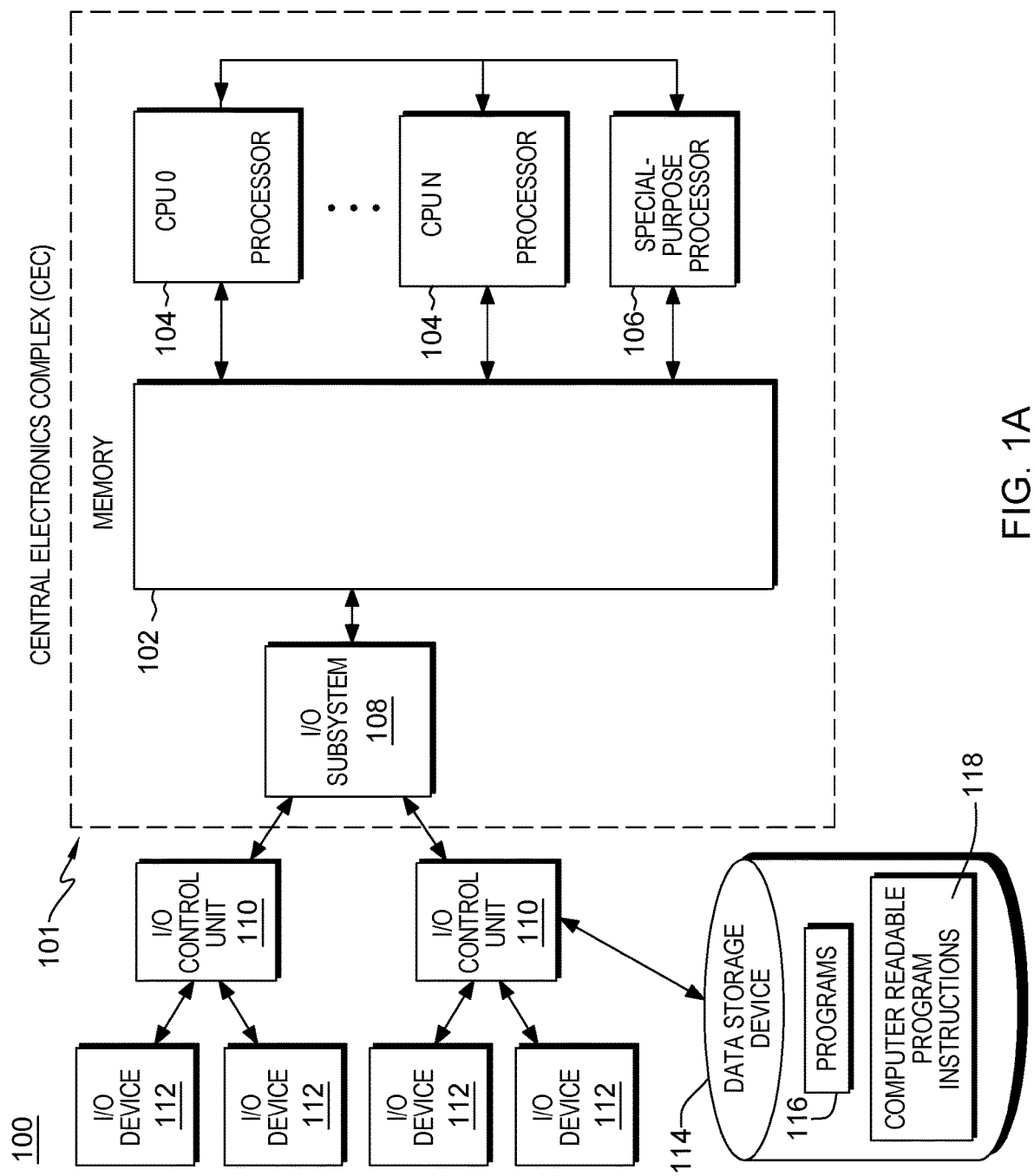
FIG. 1A depicts one example of a computing environment to incorporate and use one or more aspects of the present invention.

In accordance with one or more aspects of the present invention, a capability is provided to facilitate processing within a computing environment. As an example, a query capability is provided to obtain information relating to one or more select entities (e.g., logical partitions, processors, etc.) of the computing environment. The obtained information includes, for instance, boost information of one or more boost features currently available for at least one select entity of the computing environment. As examples, the boost information includes various boost times and/or boost cycles for processor speed and/or capacity (e.g., use of additional existing processors). As specific examples, the boost information includes information relating to one or more of the following features: total amount of speed boost time, an amount of speed boost time remaining, time until refresh of boost information (e.g., of short duration boost and/or long duration boost cycles), total amount of capacity boost time (e.g., total amount of time to be able to additionally and temporarily use one or more existing processors of the system), an amount of capacity boost time remaining, total amount of boost cycles, and/or an amount of boost cycles remaining. Additional, fewer and/or other examples are possible.

The obtained information, including the obtained boost information, may be displayed and/or used to adjust one or more attributes of a select entity, such as processor speed and/or capacity of the select entity (e.g., a logical partition, processor, etc.). Further, the obtained information may be used for enforcement to ensure that an allowed amount of a boost feature is not exceeded. Other uses are also possible.

Further, in one or more aspects, a capability is provided to temporarily adjust the boost information. In one example, a feature on demand function (or similar function) is provided that allows additional controls and features to be added to the system that extend the capabilities of the system. As an example, the feature on demand function provides one or more feature on demand structures (e.g., records) to be used to temporarily adjust or configure the limits of one or more boost features. For instance, a feature on demand structure may be used to temporarily increase the limits of one or more of speed boost time, capacity boost time and/or a number of boost cycles and/or a time period for boost cycles. Further, each feature on demand structure may provide an expiration on the temporary increase of the limits. The feature on demand function provides configurable limits on features, rather than hardcoded or unspecified limits. Additional, fewer and/or other examples are possible.

One embodiment of a computing environment to incorporate and use one or more aspects of the present invention is described with reference to FIG. 1A. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, in one example, a computing environment 100 includes a central electronics complex (CEC) 101. Central electronics complex 101 includes a plurality of components, such as, for instance, a memory 102 (a.k.a., system memory, main memory, main storage, central storage, storage) coupled to one or more processors, such as one or more general-purpose processors 104 (a.k.a., central processing units (CPUs)) and/or one or more special-purpose processors 106, and to an input/output (I/O) subsystem 108.

In one example, one or more special-purpose processors 106 may be separate, dedicated processors coupled to one or more processors 104 and/or be integrated into one or more processors 104. As a particular example, processor 104 is an IBM Z® processor and processor 106 is a z Systems® Integrated Information Processor, both offered by International Business Machines Corporation, Armonk, New York IBM Z and z Systems are trademarks or registered trademarks of International Business Machines Corporation in at least one jurisdiction. Although examples of processors are provided, other processors offered by International Business Machines Corporation and/or other companies may be used and/or incorporate one or more aspects of the invention.

I/O subsystem 108 can be a part of the central electronics complex or separate therefrom. It directs the flow of information between main storage 102 and input/output control units 110 and input/output (I/O) devices 112 coupled to the central electronics complex.

Many types of I/O devices may be used. One particular type is a data storage device 114. Data storage device 114 can store one or more programs 116, one or more computer readable program instructions 118, and/or data, etc. The computer readable program instructions can be configured to carry out functions of embodiments of aspects of the invention.

Central electronics complex 101 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 101. Examples include, but are not limited to: microcode or millicode, device drivers, redundant processing units, external disk drive arrays, RAID systems, tape drives, and data archival storage systems, etc.

Further, central electronics complex 101 can be operational with numerous other general-purpose or special-purpose computing system environments or configurations. Examples of well-known computing systems, environments, and/or configurations that may be suitable for use with central electronics complex 101 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1C:
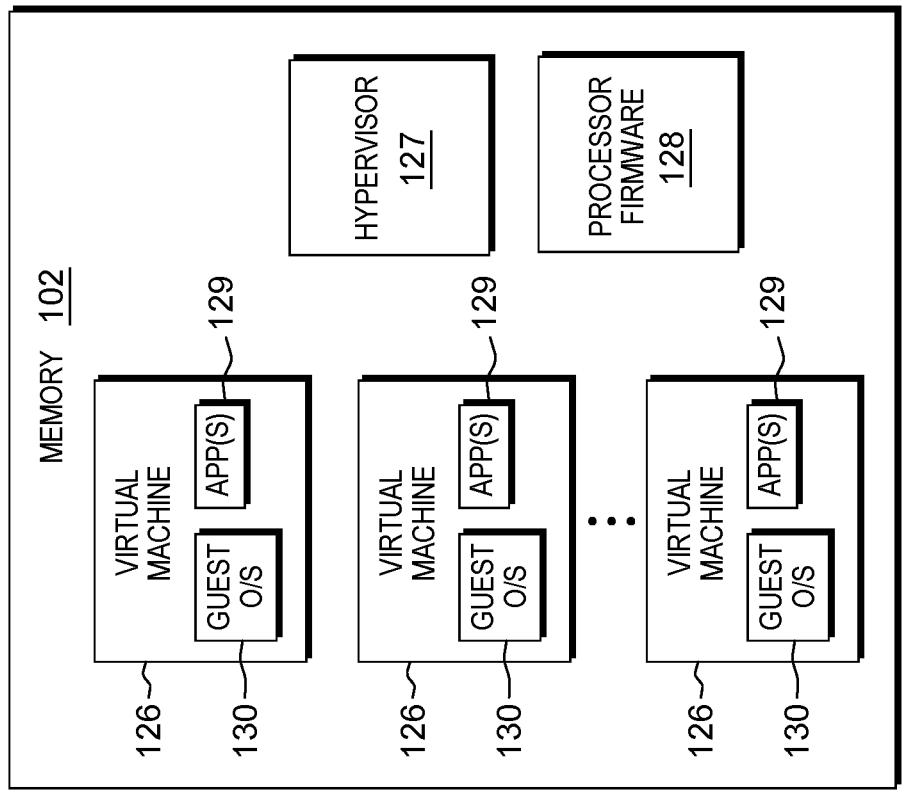
FIG. 1C depicts another example of further details of a memory of FIG. 1A, in accordance with one or more aspects of the present invention.
Figure 1B:
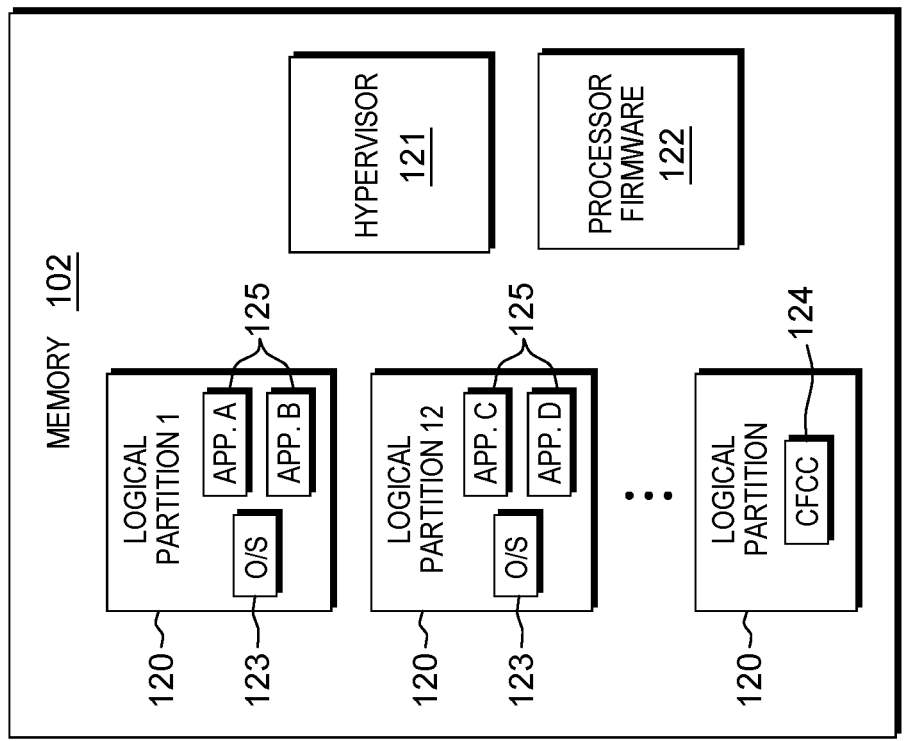
FIG. 1B depicts one example of further details of a memory of FIG. 1A, in accordance with one or more aspects of the present invention.

Central electronics complex 101 provides in one or more embodiments logical partitioning and/or virtualization support. In one embodiment, as shown in FIG. 1B, memory 102 includes, for example, one or more logical partitions 120, a hypervisor 121 that manages the logical partitions, and processor firmware 122. One example of hypervisor 121 is the Processor Resource/System Manager (PR/SM'), offered by International Business Machines Corporation, Armonk, New York PR/SM is a trademark or registered trademark of International Business Machines Corporation in at least one jurisdiction.

Each logical partition 120 is capable of functioning as a separate system. That is, each logical partition can be independently reset and run a guest operating system 123, such as the z/OS® operating system, offered by International Business Machines Corporation, Armonk, New York, or other control code, such as coupling facility control code (CFCC) 124, also offered by International Business Machines Corporation, Armonk, New York One or more of the logical partitions may operate with different programs 125. An operating system or application program running in a logical partition appears to have access to a full and complete system, but in reality, only a portion of it is available. Although the z/OS operating system and coupling facility control code are offered as examples, other operating systems and/or control code offered by International Business Machines Corporation and/or other companies may be used in accordance with one or more aspects of the present invention. z/OS is a trademark or registered trademark of International Business Machines Corporation in at least one jurisdiction.

Memory 102 is coupled to, e.g., CPUs 104 (FIG. 1A), which are physical processor resources that can be allocated to the logical partitions. For instance, a logical partition 120 may include one or more logical processors, each of which represents all or a share of a physical processor resource 104 that can be dynamically allocated to the logical partition, and/or a logical partition may have one or more processors dedicated thereto.

In yet a further embodiment, the central electronics complex provides virtual machine support (either with or without logical partitioning support). As shown in FIG. 1C, memory 102 of central electronics complex 101 includes, for example, one or more virtual machines 126, a virtual machine manager, such as a hypervisor 127, that manages the virtual machines, and processor firmware 128. One example of hypervisor 127 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

Processor firmware 122 (FIG. 1B), 128 (FIG. 1C) includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central electronics complex provides the ability to operate large numbers of virtual machines 126, each capable of operating with different programs 129 and running a guest operating system 130, such as the Linux® operating system. Each virtual machine 126 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 1D:
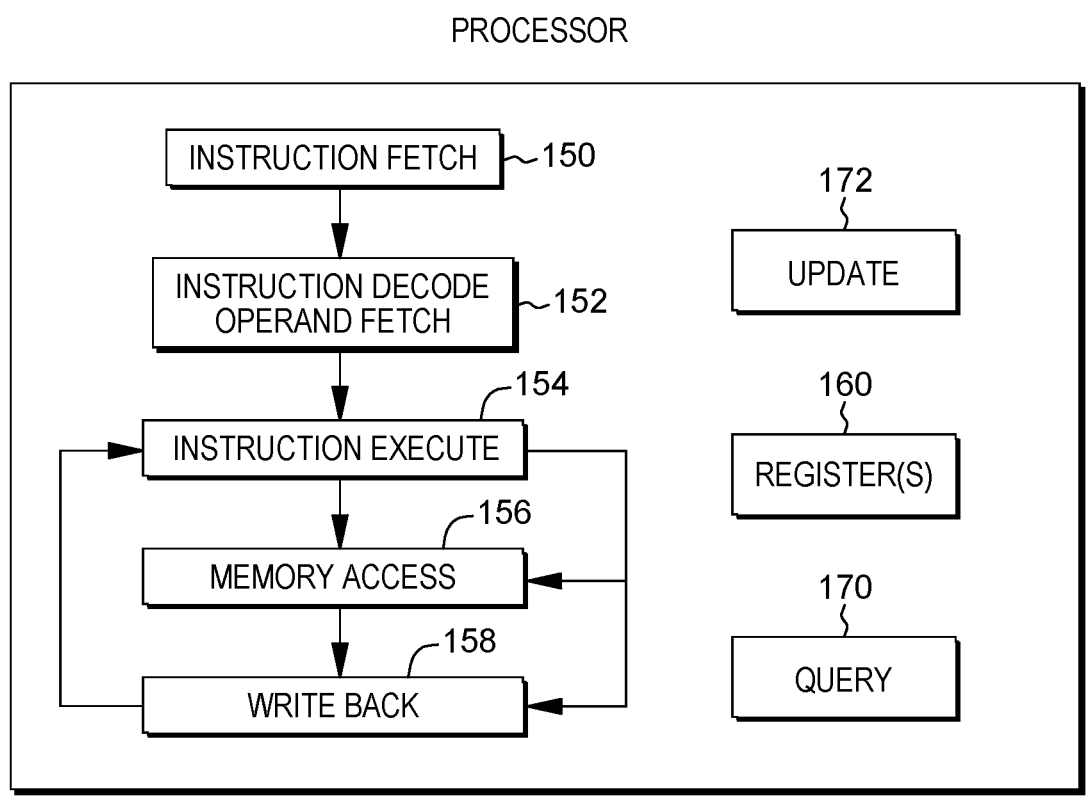
FIG. 1D depicts further details of a processor of FIG. 1A, in accordance with one or more aspects of the present invention.

In one example, a processor (e.g., processor 104 and/or processor 106) includes a plurality of functional components (or a subset thereof) used to execute instructions. As depicted in FIG. 1D, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing a query function related to boost information and/or to update system capabilities (or other processing that may use one or more aspects of the present invention), as described herein. The one or more other components may include, for instance, a query component 170 and/or an update component 172 (and/or one or more other components).

In accordance with one or more aspects of the present invention, a query function is provided to obtain boost information for one or more select entities of a computing environment, such as one or more central processing units, and/or one or more logical partitions, etc. As an example, the query function is executed by an operating system executing on a processor, such as processor 104, and based on executing the query function, boost information is obtained for one or more select entities. As an example, the boost information includes information regarding one or more boost features of multiple boost pools currently available for at least one select entity. The plurality of boost pools includes, for instance, processor speed and capacity, and the boost features include, for instance, a total amount of boost time available; a remaining amount of boost time currently available for use; a time until refresh of a select feature (e.g., short duration of boost—speed, capacity); a total number of available boost cycles; a number of remaining boost cycles, and/or a time until refresh of long duration boost cycles. Boost information may be obtained for additional, fewer and/or other pools, and/or the obtained information may include additional, fewer and/or different features and/or information. Many variations are possible.

Figure 2:
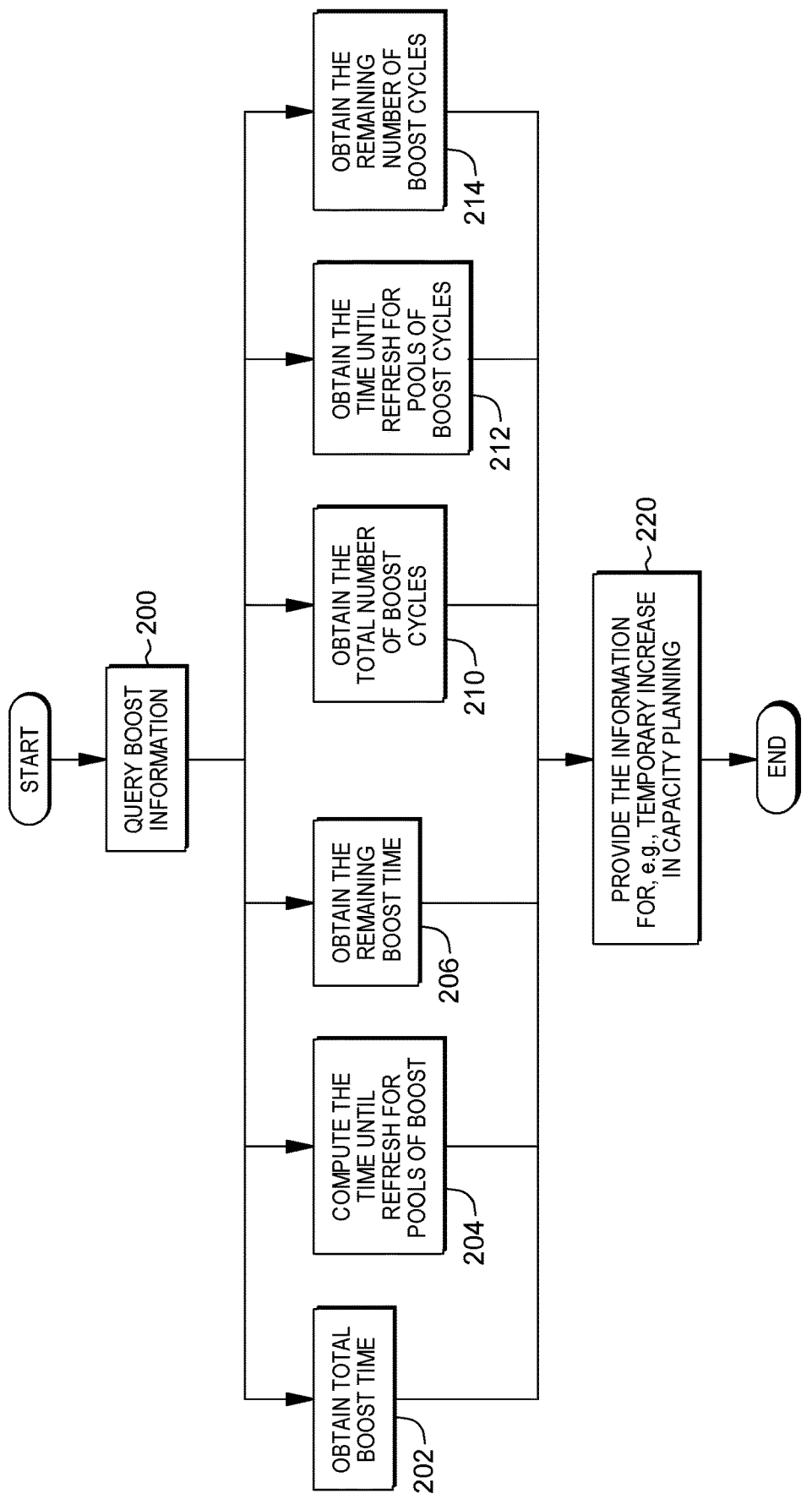
FIG. 2 depicts one example of performing a query operation to obtain boost information, in accordance with one or more aspects of the present invention.

Further details relating to a query function to obtain boost information for a select entity are described with reference to FIG. 2. In one example, a query boost information operation is performed to obtain boost information for a select entity, such as a central processing unit, a logical partition, etc., 200. As examples, based on performing the query operation, one or more of the following boost features are obtained: total boost time for the select entity 202, including, for instance, total speed boost time and total capacity boost time; an indication of when one or more boost pools (e.g., speed, capacity) is going to be refreshed 204; an amount of boost time remaining 206 for, e.g., speed boost and capacity boost; a total number of long duration boost cycles 210; an indication of when long duration boost cycles is going to be refreshed 212; and a remaining number of long duration boost cycles 214. Information for additional, fewer and/or other features may also be obtained.

This obtained information is provided to, e.g., software, such that it is learned, for instance, how much total speed/capacity boost time is available, how much boost time/boost cycles are remaining, and/or when additional time/cycles will be available 220. This obtained information may be used to adjust one or more of attributes of the select entity, such as speed and/or capacity. For instance, based on the obtained information, a temporary increase in capacity and/or speed may be provided. The adjustments may be provided for recovery, shut-down and/or at initial program load, as examples. Additional, fewer and/or other adjustments may be made.

In one example, to perform the query function, an instruction is executed, such as a Diagnose instruction of the z/Architecture instruction set architecture. However, other instructions, functions or commands of the z/Architecture instruction set architecture or other architectures may be used. The Diagnose instruction is used, for instance, by a processor to perform built-in diagnostic functions or other model-dependent functions. One example of a Diagnose instruction is described with reference to FIG. 3.

Figure 3:
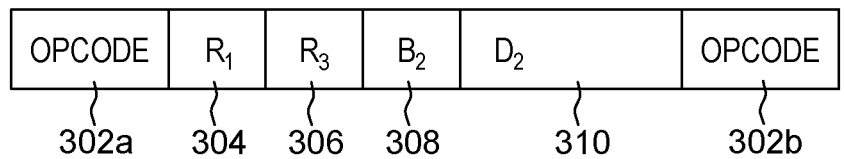
FIG. 3 depicts one example of a Diagnose instruction used to perform a query operation, in accordance with one or more aspects of the present invention.

In one example, referring to FIG. 3, a Diagnose instruction 300 includes a plurality of fields including, for instance, one or more operation code (opcode) fields 302a, 302b to indicate a diagnose operation; a register field ($R_1$) 304 that may designate, e.g., an even register of an even-odd pair of general registers that may be used by the instruction, as described herein; another register field ($R_3$) 306 that designates, for instance, a function code used by the instruction; a base field $B_2$ 308; and a displacement field $D_2$ 310, each of which is further described below. In the description herein of the instruction, functions and/or operations of the instruction, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. A bit, if set, may be set to a different value, such as the opposite value or to another value, in other examples. Many variations are possible.

In one example, based on operation completion, the contents of general registers $R_1$ (304) and $R_1+1$ depend on the function code specified in general register $R_3$ 306.

Further, in one example, the contents of displacement field (D$_2$) 310 are added to the contents of the general register specified by base field B$_2$ 308 to obtain, e.g., a 64-bit value. This value is not used to address data; instead, in one example, bits 0-47 are ignored and bits 48-63 are used as an operation-code extension.

In one embodiment, in execution of Diagnose instruction 300, based on the operation-code extension being a select value, select bits (e.g., bits 56-63) of general register R$_3$ include a function code (e.g., a binary function code) that specifies the function to be performed.

On operation completion, in one example, the contents of general registers R$_1$ and R$_1$+1 depend on the function code specified in general register R$_3$. If the R$_1$ and R$_3$ fields are equal, then the description of the contents of R$_1$ and R$_1$+1 applies to the contents of R$_3$ and R$_{3+1}$; otherwise, the value of general registers R$_3$ and R$_{3+1}$ remain unchanged on operation completion.

In one example, the function code field in, e.g., bit positions 56-63 of general register R$_3$ includes, e.g., an 8-bit unsigned binary integer that can specify a selected function code, such as function code 8 specifying a query system recovery boost information block function. Additional and/or other functions may be specified by selected function codes:

One example of processing associated with function code 8 (query system recovery boost information block) is described herein. In one example, when general register R$_3$ includes a select query function code (e.g., 8), the machine provides the information for pools of, e.g., recovery process boost time for each of the two boost types (speed boost, capacity boost) and information for a number of long duration boost cycles, and time until the number of long duration boost cycles count is reset. In other examples, information for additional, fewer and/or other pools is provided. Further, additional, less and/or other information may be provided.

As an example, this information is obtained from one or more locations, including, but not limited to, one or more feature on demand structures (e.g., records) or other structures described herein. Further, in one example, the information is for each logical partition. As an example, counters are provided for each logical partition (or a subset thereof).

In operation of function code 8, an information block is stored at the logical address specified by the contents of general register R$_3$+1. The address is generated under the control of the current addressing mode. The address is to be designated on, e.g., a 4K-byte boundary. The length of the designated information block is, e.g., 4K-bytes.

At completion of the operation, the following applies, in one example:

Select bits (e.g., bits 0-47) of general register R$_1$+1 are set to, e.g., zeros.

Select bits (e.g., bits 48-63) of general register R$_1$+1 include a response code (e.g., 16-bits).

Figure 4:
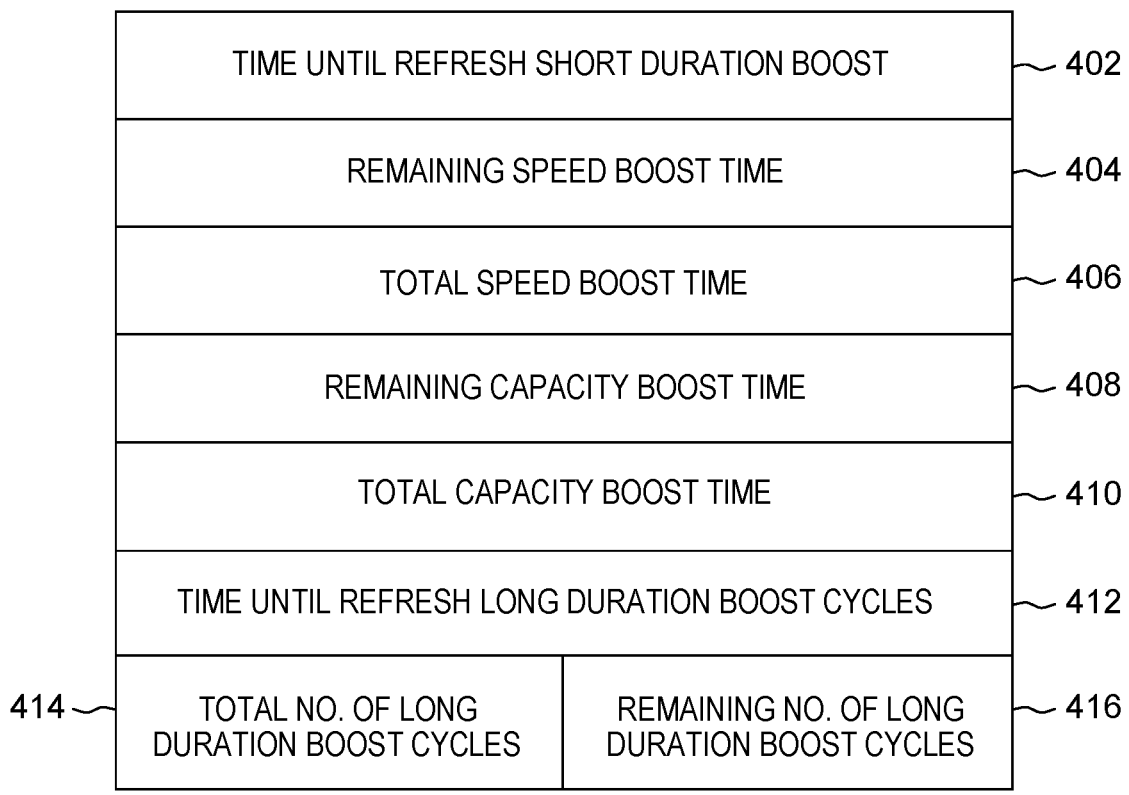
FIG. 4 depicts one example of an information block obtained via a query operation, in accordance with one or more aspects of the present invention.

One example of the information block is described with reference to FIG. 4. In one example, the information block is used for recovery, and is therefore, referred to as a Query System Recovery Boost Information Block. The queried values reflect, for instance, an amalgamation of default values that are provided. These values may be overridden (e.g., replaced or augmented) via limits provided by, e.g., feature on demand structures, described below. However, a similar information block may be used for processes other than recovery, such as shut-down, initial program load, etc. One example of a Query System Recovery Boost Information Block 400 includes, for instance:

Time until Refresh Short Duration Boost 402: The time remaining in the current 24-hour period (or other time period) until the current pool of boost time (e.g., recovery process boost time) for speed boost and capacity boost is refreshed. The value stored has the same format as, e.g., bits 0-63 of a time-of-day (TOD) clock.

Remaining Speed Boost Time 404: The amount of time remaining in the current 24-hour period (or other time period) for boost time (e.g., recovery process boost time) for speed boost. The value stored has the same format as, e.g., bits 0-63 of a time-of-day (TOD) clock.

Total Speed Boost Time 406: The total amount of speed boost time (e.g., recovery process speed boost time) includes a summation of the available default amount of speed boost time (e.g., recovery process speed boost time) and an additional purchased (or other) speed boost time (e.g., recovery process speed boost time) for the current 24-hour period (or other time period). This is set at the beginning of, e.g., the current 24-hour period (or other time period) and the value is stored as, e.g., number of minutes. Other variations are possible.

Remaining Capacity Boost Time 408: The amount of time remaining in the current 24-hour period (or other time period) for boost time (e.g., recovery process boost time) for capacity boost (e.g., special-purpose processor (e.g., a z Systems Integrated Information Processor) boost). The value stored has the same format as, e.g., bits 0-63 of a time-of-day (TOD) clock.

Total Capacity Boost Time 410: The total amount of capacity boost time (e.g., recovery process special-purpose processor boost time) includes a summation of the available default amount of capacity boost time and an additional purchased (or other) capacity boost time of the current 24-hour period (or other time period). This is set at the beginning of, e.g., the current 24-hour period (or other time period) and the value is stored as, e.g., number of minutes. Other variations are possible.

Time Until Refresh Long Duration Boost Cycles 412: The amount of time remaining until the remaining number of long duration boost cycles is reset to a maximum number of allowed long duration boost cycles. The value stored has the same format as, e.g., bits 0-63 of a time-of-day clock.

Total Number of Long Duration Boost Cycles 414: An integer value, as an example, which gives a maximum number of allowed long duration boost cycles per time period. A boost cycle includes a set of long duration boosts within, e.g., an initial program load.

Remaining Number of Long Duration Boost Cycles 416: An integer value, as an example, which gives the current number of available long duration boost cycles per time period. A boost cycle includes a set of long duration boosts within, e.g., an initial program load. The count decrements for the first successful long duration boost of, e.g., the initial program load.

Although certain time periods are provided as examples, other time periods may be provided in other examples.

Figure 5A:
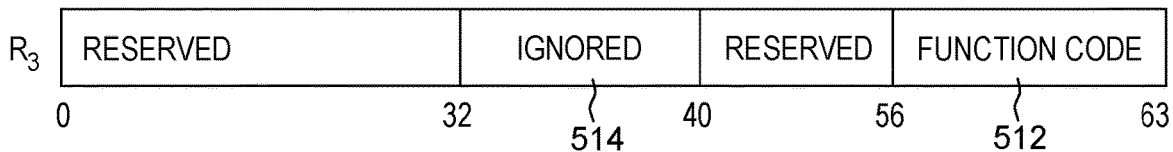
FIG. 5A depicts one example of contents of a general register before execution of a select function code of the Diagnose instruction of FIG. 3, in accordance with one or more aspects of the present invention.
Figure 5B:
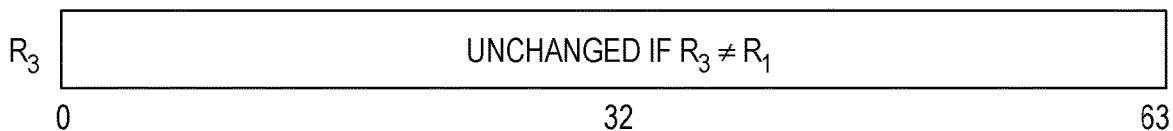
FIG. 5B depicts one example of contents of the general register of FIG. 5A at completion of execution of the select function code of the Diagnose instruction, in accordance with one or more aspects of the present invention.
Figure 5C:
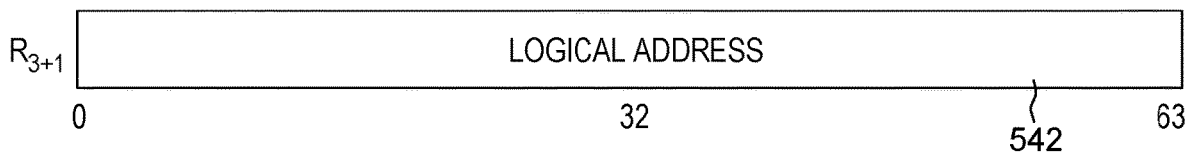
FIG. 5C depicts one example of contents of another general register before execution of the select function code of the Diagnose instruction, in accordance with one or more aspects of the present invention.

A summary of the general registers used for a select query function code (e.g., function code 8) of the Diagnose instruction is depicted in FIGS. 5A-5F. As examples:

In FIG. 5A, a general register R$_3$ 500 is depicted, in which contents before execution of function code 8 include a function code 512 (e.g., bits 56-63) and ignored bits 514 (e.g., bits 32-39);

In FIG. 5B, a general register $R_3$ 520 is depicted, in which contents at completion of function code 8 remain unchanged if, for instance, $R_3$ is not equal to $R_1$;

In FIG. 5C, a general register $R_3+1$ (540) is depicted, in which contents before execution of function code 8 includes a logical address 542 (e.g., bits 0-63);

In FIG. 5D, a general register $R_3+1$ (550) is depicted, in which contents at completion of the query function remain unchanged if, for instance, $R_3$ is not equal to $R_1$;

In FIG. 5E, a general register $R_1$ 560 is depicted, in which contents at completion of the query function remain unchanged; and In FIG. 5F, a general register $R_1+1$ (580) is depicted, in which contents at completion of function code 8 include a response code 582 (e.g., bits 48-63) and zeros (e.g., bits 0-47).

Each register may include additional, fewer, and/or other information. Further, information may be stored in different locations (e.g., bits) within the registers. Many variations are possible.

As described herein, a query function is provided that enables the obtaining of boost information (e.g., boost time—total, remaining, refresh time, etc. and/or boost cycles) for different types or pools of boost (e.g., speed and/or capacity). The boost time is, for instance, for a short duration boost; however, in other embodiments, it may be for a short duration boost, a long duration boost and/or a combination of short and long duration boosts. As examples, the information provides an indication of how long before the counters for the different pools for boost time will be reset; total amount of boost time available; remaining amount of boost time currently available for use; how long before the counters for the different pools for boost cycles will be reset; a total number of boost cycles available for boost; and/or the remaining number of boost cycles currently available for use. Additional, less and/or other information may be obtained for one or more of the boost pools (e.g., speed and/or capacity). Further, there may be additional, fewer and/or other pools. Yet further, the information may be separated by short and long duration boost or, in another embodiment, combined. Many variations may exist. The obtained information is used to facilitate, e.g., display of the information; enforcement on the limits provided; software planning on use of temporary processor (e.g., central processing unit) capacity update, use of temporary processor (e.g., central processing unit) speed update, and use of boost cycles, as examples.

In a further aspect, one or more features on demand are provided to temporarily adjust limits on processor capacity (e.g., ability to temporarily use one or more other existing processors for a workload) and/or speed boost times on-demand. For instance, a feature is provided, in accordance with one or more aspects of the present invention, which increases short duration boost limit(s) to allow a processor to have an additional amount of short duration boost time. These limits are enforced by, e.g., firmware. The features on demand allow, for example, a change, update or refresh of, for instance:

A purchase of additional short duration boost time which can be priced;

Have an additional short duration boost time which can be used for testing purposes;

Update the short duration boost time and set it to a maximum available value (e.g., free+purchased/test/ other);

Able to refresh short duration boost time (e.g., free+ purchased/test/other) in terms of a time period, e.g., calendar time (e.g., per 24-hour period); and Have an expiration for the purchased additional short duration boost time in terms of a time period, e.g., calendar time (e.g., 24-hour period).

Additional, fewer and/or other features may be provided. Further, features may be provided for reasons other than test or purchase. Moreover, other time periods may be used. Many variations are possible.

As described herein, in accordance with one or more aspects of the present invention, a facility is provided to have, as examples, an additional amount of short duration boost time, which can be purchased, allocated for testing purposes and/or obtained for one or more other reasons. Further, in one or more aspects of the present invention, a facility is provided to reset the pools (e.g., counters) of short duration boost time to a maximum available value (e.g., free+purchased/test; free+other). Yet further, in one or more aspects of the present invention, a feature is provided which sets an expiration time for a pool of short duration boost in terms of a time period, e.g., calendar time (e.g., per 24-hour period or other select period).

To provide one or more of the above features, a feature on demand structure is provided to override (e.g., replace, augment, etc.) the amount of boost time (e.g., recovery process boost time that is free) in effect with additional time (e.g., free+purchased/test; free+other; etc.). A feature on demand is an extension to, e.g., firmware, that provides a mechanism of configuring, defining and controlling access to firmware capabilities. It is an extension of, for instance, an asset control structure provided by the Licensed Internal Code Configuration Control structure. Each feature on demand structure has a basic structure that includes, for instance, N bytes of control data followed by an amount of fixed data that pertains to the feature. The control data includes, for instance, information that uniquely identifies the feature, how it should be handled by the firmware, and the format and length of the data to follow.

In one example, the manufacturer of the processor builds one or more structures that provide various features. The firmware, as an example, is able to replace one or more of the structures to provide additional, fewer and/or other features.

Figure 6A:
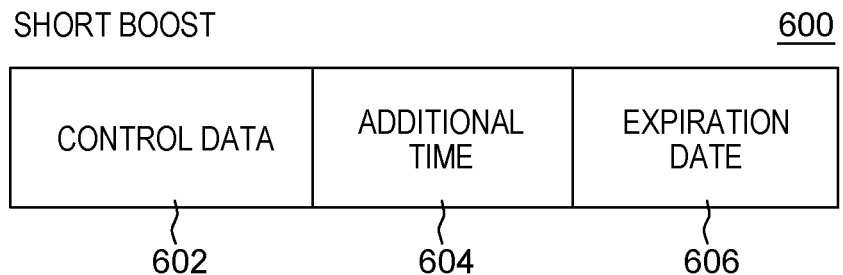
FIG. 6A depicts one example of a feature on demand structure for a short duration boost, in accordance with one or more aspects of the present invention.

One example of a feature on demand structure for a short boost is depicted in FIG. 6A. As shown, a feature on demand structure 600 includes, for instance, control data 602 (e.g., N bytes) to indicate, e.g., whether additional time 604 is for additional speed boost minutes and/or capacity boost minutes, additional time 604 (e.g., 2 bytes) and an expiration date 606 (e.g., 8 bytes). Other variations are possible, including but not limited to, additional, fewer and/or other information and/or different sizes to the fields.

Figure 6B:
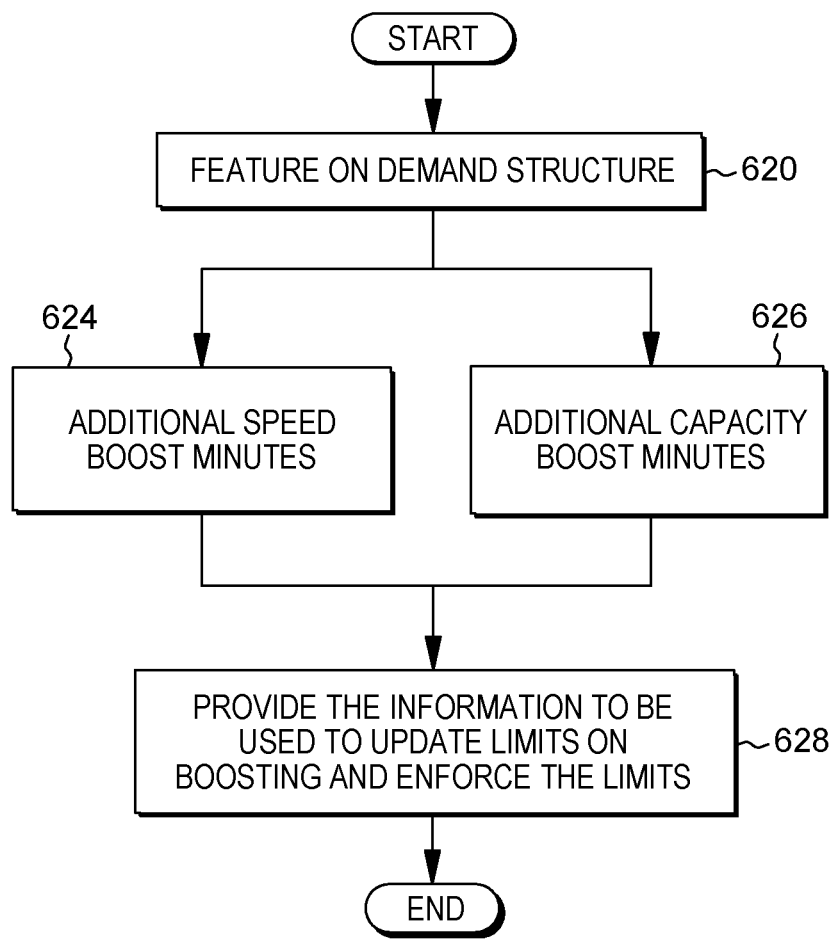
FIG. 6B depicts one example of processing associated with the feature on demand structure of FIG. 6A, in accordance with one or more aspects of the present invention.

In one example, referring to FIG. 6B, a feature on demand structure 600 is obtained 620 that indicates, e.g., additional speed boost (e.g., recovery process speed boost) minutes 624 and/or additional capacity boost (e.g., recovery process special-purpose processor boost) minutes 626. A unit of time other than minutes may also be used; minutes is only one example. This obtained information is provided to, e.g., firmware, which may change the limits and enforce the limits on how much boosting can be performed (e.g., by software) 628. As examples, the amount of speed boost time and/or capacity time may be increased for, e.g., a specified amount of time.

In yet a further aspect, one or more features on demand are provided to temporarily provide an additional number of boost cycles (e.g., long duration boost cycles). In one example, a feature on demand structure is provided to temporarily provide an additional number of long duration boost cycles per select entity (e.g., logical partition) over a period of time. For instance, a feature is provided, in accordance with an aspect of the present invention, which allows a processor to have an additional number of long duration boost cycles or allows a processor to have an additional number of long duration boost cycles per, e.g., logical partition over a period of time, as examples. One or more features allow, for instance, a change, update or refresh of, for instance:

A purchase of an additional number of long duration boost cycles which can be priced;

Have an additional number of long duration boost cycles which can be used for testing purposes;

Have an offering to provide an additional number of long duration boost cycles which can be used for an offering (e.g., a stress test (or other) offering), a validation solution, other testing, etc.

Update the number of long duration boost cycles and set it to a maximum available value (e.g., default (or in effect)+purchased/test/offering/other) in terms of a time period, e.g., calendar time (e.g., 30-day period or other time period); and Have an expiration for the number of long duration boost cycles in terms of a time period, e.g., calendar time (e.g., 6-month period or other time period).

Additional, fewer and/or other features may be provided. Further, features may be provided for reasons other than test or purchase. Each feature may have an expiration date associated therewith. Moreover, other time periods may be used. Many variations are possible.

As described herein, in accordance with one or more aspects of the present invention, an ability is provided to have, for instance, an additional number of long duration boost cycles. As examples, the ability includes one or more of the following: a feature to purchase (or otherwise obtain) an additional number of long duration boost cycles, which can be priced; have an additional number of long duration boost cycles which can be used for testing (or other) purposes; and/or an offering which provides an additional number of long duration boost cycles which can be used for stress test (or other) offering (e.g., of an IBM Z system), validation solutions and/or other testing, as examples. Further, in one or more aspects of the present invention, an ability is provided to reset the counters for a number of long duration boost cycles and set each to a maximum available value (e.g., free+purchased/test/offering/other). Yet further, in one or more aspects of the present invention, a feature is provided which sets an expiration time for a pool of long duration boost cycles in terms of a time period, e.g., calendar time (e.g., per 30-day period, other time period). In yet a further example, the ability to change an expiration time for a pool of long duration boost cycles is provided.

Figure 7A:
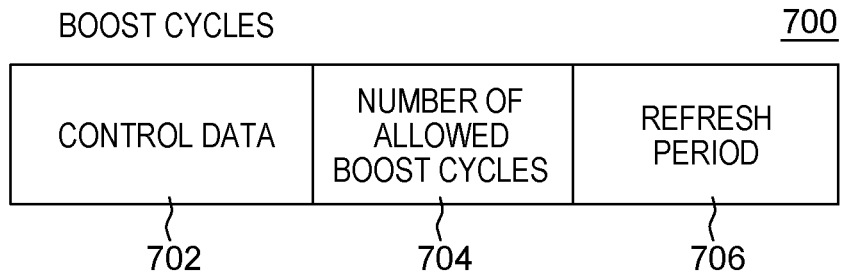
FIG. 7A depicts one example of a feature on demand structure for long duration boost cycles, in accordance with one or more aspects of the present invention.

To provide one or more of the above features, a feature on demand structure (or other structure) is provided to allow an additional number of long duration boost cycles (e.g., purchased/test/offering/other). One example of a feature on demand structure for boost cycles is depicted in FIG. 7A. As shown, a feature on demand structure 700 includes, for instance, control data 702 (e.g., N bytes), number of allowed boost cycles 704 (e.g., 2 bytes) and a refresh period 706 (e.g., 2 bytes). Refresh period 706 provides, e.g., a time duration to consume the number of allowed boost cycles, as well as a period after which the replenish value available in 704 may be used. For instance, if field 704 has a value 10 which indicates a maximum of 10 boost cycles to consume, refresh period 706 indicates a time period (e.g., 30 days) to consume the 10 boost cycles and these may be replenished to a value available in 704 after that time (e.g., after 30 days).

Figure 7B:
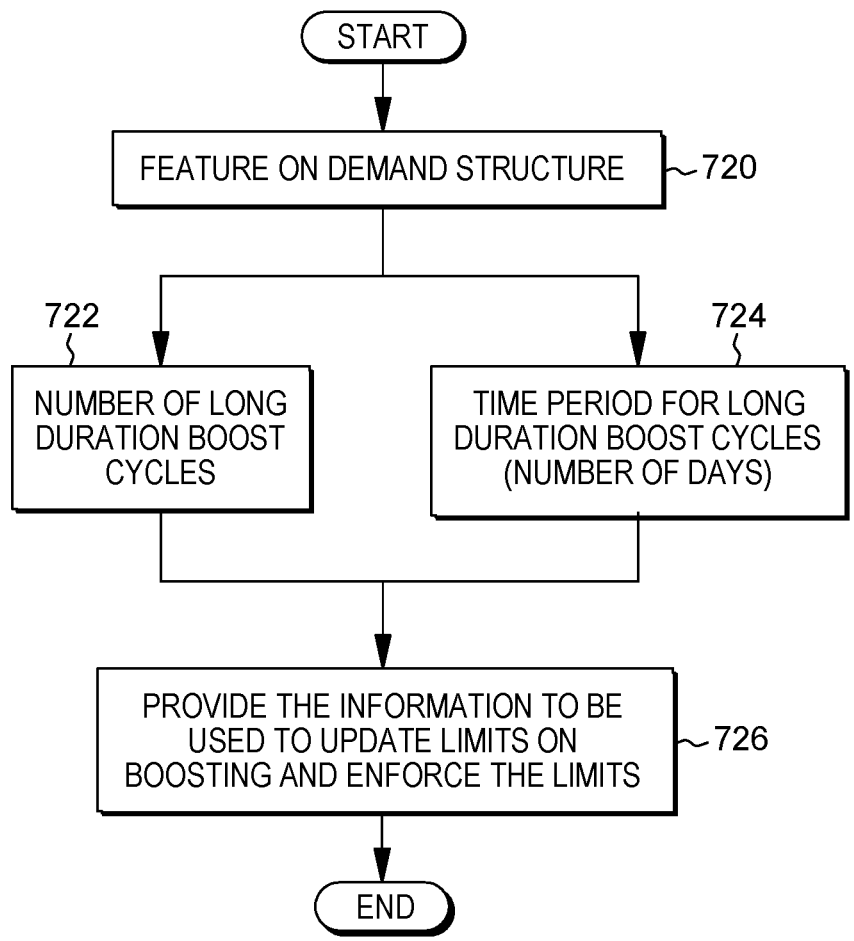
FIG. 7B depicts one example of processing associated with the feature on demand structure of FIG. 7A, in accordance with one or more aspects of the present invention.

In one example, referring to FIG. 7B, a feature on demand structure 700 is obtained 720 that indicates, e.g., a number of long duration boost cycles 722, and/or a time period for long duration boost cycles (e.g., number of days; other) 724. This obtained information is provided to, e.g., firmware, and may be used for updating the limits and enforcing the limits on how much boosting can be performed (e.g., by software), 726. For instance, the number of cycles and/or duration of cycles may be increased. A mechanism is used, in one or more aspects, to provide an additional number of boost cycles with an expiration limit used for a number of temporary processor (e.g., central processing unit capacity, speed) updates with an ability to upgrade using, e.g., a priced model or other model.

In one example, a Read SCP (System Configuration Parameters) Information command provides, for instance, the additional (e.g., purchased/test/other) speed boost minutes, the additional (purchased/test/other) capacity boost time (e.g., special-purpose processor boost minutes), and/or the additional boost cycles.

One example of a Read SCP (System Configuration Parameters) Information command is described with reference to FIG. 8A. As an example, a Read SCP Information command 800 includes an operation code field 802 specifying a read system configuration parameters information operation and a command class code field 804. In operation, the Read SCP Information command reads system configuration parameters stored in a system configuration control block, including, in accordance with one or more aspect of the present invention, the boost information for the feature on demand structures.

One example of a portion of a System Configuration Control Block is described with reference to FIG. 8B. In one example, a System Configuration Control Block 810 includes, for instance, the information of the feature on demand record described with reference to FIGS. 6A-6B, which provides updated limits that are provided by and enforced by, e.g., firmware. As an example, System Configuration Control Block 810 includes additional speed boost (e.g., recovery process speed boost) minutes 812, additional capacity (e.g., recovery process special-purpose processor) boost minutes 814, an expiration date for the additional speed boost minutes 816 and an expiration date for the additional capacity boost minutes 818 (each of fields 816, 818 has a format similar to, e.g., bits 0-63 of a time-of-day clock). Additional, less and/or other information may be provided.

In accordance with one or more aspects of the present invention, the counters of boost time are reset to a maximum available value (e.g., free+purchased/test/other) after every fixed duration of time (e.g., per 24-hour period or other time period). A set expiration time is used for a boost pool in terms of a time period, e.g., calendar time (e.g., 24-hour period or other time period). The purchased/test/other feature on demand structures also have an expiration (e.g., 1 month, 3 months, any select amount of time in any select time interval). The additional (e.g., purchased/test/other) boost time (e.g., minutes) are set to, e.g., zero when the feature on demand expires.

Another example of a portion of a System Configuration Control Block is described with reference to FIG. 8C. In one example, a System Configuration Control Block 820 includes, for instance, the information of the feature on demand record described with reference to FIGS. 7A-7B, which provides updated limits on boosting that are configured and enforced by, e.g., firmware. As an example, System Configuration Control Block 820 includes, a number of long duration boost cycles 822 and a time period for long duration boost cycles (number of days or other time period) 824. Additional, less and/or other information may be provided.

In another example, instead of a Read SCP Information Command, a PC Call command is used to obtain the information. Other variations are also possible.

As described herein, in one or more aspects, a facility is provided to update the amount of boost time based on, e.g., feature on demand structures that can be concurrently applied.

Further, in one or more aspects, a capability is provided that monitors and allows for the development of different techniques to control the consumption of boost time and/or boost cycles. For instance, based on the query, one or more changes may be made to use more or less of the provided/available boosts.

In one example, the pools for boost time provide additional granularity, such as those that provide standard data (e.g., in effect short duration boost time, in effect long duration boost time/cycles, etc.), those that indicate purchased or other boost time, etc. Other variations are also possible.

One or more aspects of the present invention are inextricably tied to computer technology and facilitate processing within a computer, improving performance thereof. By obtaining information regarding boost times/boost cycles and being able to adjust one or more times/number of cycles, on demand, performance is improved.

Further details of one embodiment of facilitating processing within a computing environment, as it relates to one or more aspects of the present invention, are described with reference to FIGS. 9A-9B.

Referring to FIG. 9A, a query operation is performed to obtain information for a select entity of the computing environment 900. The information includes boost information of one or more boost features currently available for the select entity 902. The one or more boost features are to be used to temporarily adjust one or more processing attributes of the select entity 904. The boost information obtained from performing the query operation is provided in an accessible location to be used to perform one or more actions to facilitate processing in the computing environment 906.

A query operation provides details regarding boost information that may be used to monitor performance and/or to control the consumption of boost and/or boost cycles.

As examples, the one or more boost features are used to temporarily adjust the speed of a processor of the select entity or of the select entity itself, and/or to provide additional capacity to the select entity by, for instance, using an existing special-purpose processor to be used to perform work of the select entity.

Further, in one or more examples, the one or more actions include monitoring use of the one or more boost features and/or controlling the consumption of the one or more boost features.

As examples, the select entity includes a logical partition of the computing environment 908 or a processor of the computing environment 910. Other select entities are also possible.

Further, the one or more boost features include, for instance: a total amount of speed boost time for the select entity and an amount of speed boost time remaining for the select entity 912, a total amount of capacity boost time for the select entity and an amount of capacity boost time remaining for the select entity 914, a total amount of boost cycles for the select entity and an amount of boost cycles remaining for the select entity 916, and/or a time until refresh of at least one boost feature of the one or more boost features 918. Additional, fewer and/or other boost features are also possible.

In one example, the query operation provides the ability to know how much speed boost time there is for the select entity and/or the amount of speed boost time remaining for the select entity, which provides the ability for monitoring and/or controlling consumption of speed boost.

In one example, the query operation provides the ability to know when one or more features of the boost information (e.g., speed, capacity, cycles) are to be refreshed, which provides the ability for monitoring and/or controlling consumption of speed boost, capacity boost, and/or boost cycles.

In one example, the query operation provides the ability to know how much capacity boost time there is for the select entity and/or the amount of capacity boost time remaining for the select entity, which provides the ability for monitoring and/or controlling consumption of capacity boost.

In one example, the query operation provides the ability to know how many boost cycles there are for the select entity and/or the amount of available boost cycles remaining for the select entity, which provides the ability for monitoring and/or controlling consumption of boost cycles.

Referring to FIG. 9B, in one example, at least one boost feature of the computing environment is configured 920. The configuring provides at least one limit for the at least one boost feature. The configuring of one or more boost features improves system performance.

The configuring the at least one boost feature includes using one or more adjusted feature amounts obtained from one or more feature on demand structures to configure the at least one boost feature 922. The one or more feature on demand structures is used to override one or more boost limits in effect 924.

As an example, a feature on demand structure of the one or more feature on demand structures provides an indication of an additional amount of a boost feature to be purchased or allocated for a select purpose, and an indication of an expiration period for the additional amount 926.

Other variations and embodiments are possible.

In one or more aspects, a technique is provided to query boost information relating to one or more boost features. As examples, these boost features may be used for initial program load boost (e.g., provide an increase in speed/capacity during initial program load), shut-down boost (e.g., provide an increase in speed/capacity during shut-down) and/or recovery process boost (e.g., provide an increase in speed/capacity during recovery processing). In one or more aspects, a technique is provided to control an amount of boost and/or boost cycles available for a select entity over a period of time.

In one aspect, additional compute capacity, as an example, is allocated to a single compute resource (e.g., increase capacity of a processor or logical partition and/or increase the speed of a single compute resource). This is applicable for use to increase the capacity and/or speed of a select number (including all) processors or logical partitions, as available and desired.

Figure 10:
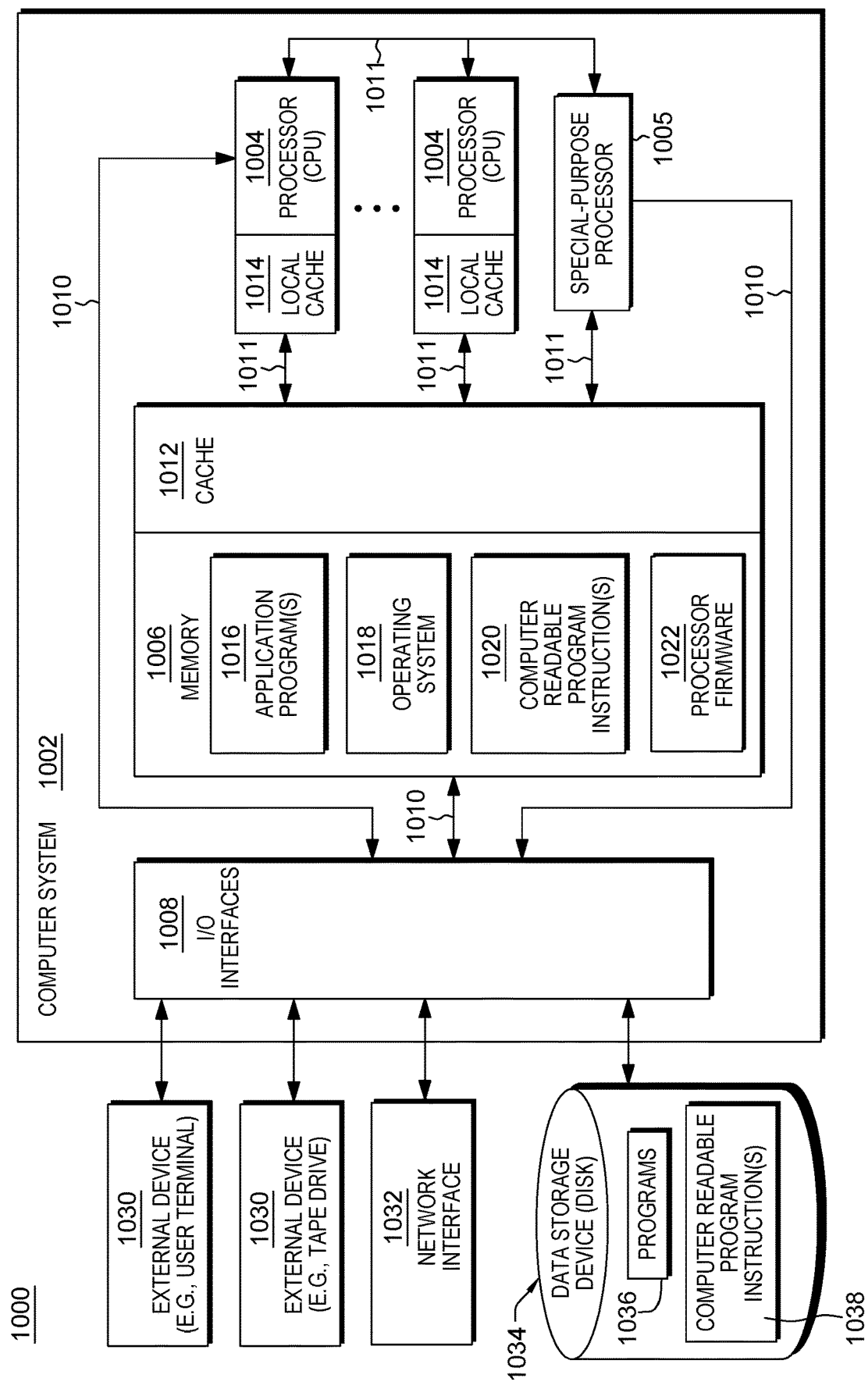
FIG. 10 depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 10. As an example, the computing environment of FIG. 10 is based on the z/Architecture® instruction set architecture offered by International Business Machines Corporation, Armonk, New York. The z/Architecture instruction set architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

Referring to FIG. 10, a computing environment 1000 includes, for instance, a computer system 1002 shown, e.g., in the form of a general-purpose computing device. Computer system 1002 may include, but is not limited to, one or more general-purpose processors or processing units 1004 (e.g., central processing units (CPUs)), one or more special-purpose processors 1005, a memory 1006 (a.k.a., system memory, main memory, main storage, central storage or storage, as examples), and one or more input/output (I/O) interfaces 1008, coupled to one another via one or more buses and/or other connections. For instance, processors 1004, 1005 and memory 1006 are coupled to I/O interfaces 1008 via one or more buses 1010, and processors 1004 and 1005 may be coupled to one another via one or more buses 1011. In another example, processor 1005 is integrated in one or more processors 1004.

Bus 1011 is, for instance, a memory or cache coherence bus, and bus 1010 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1006 may include, for instance, a cache 1012, such as a shared cache, which may be coupled to local caches 1014 of processors 1004 and/or to processor 1005, via, e.g., one or more buses 1011. Further, memory 1006 may include one or more programs or applications 1016, and at least one operating system 1018. An example operating system includes a z/OS® operating system, offered by International Business Machines Corporation, Armonk, New York Other operating systems offered by International Business Machines Corporation and/or other entities may also be used. Memory 1006 may also include one or more computer readable program instructions 1020, which may be configured to carry out functions of embodiments of aspects of the invention, and processor firmware 1022.

Computer system 1002 may communicate via, e.g., I/O interfaces 1008 with one or more external devices 1030, such as a user terminal, a tape drive, a pointing device, a display, and one or more data storage devices 1034, etc. A data storage device 1034 may store one or more programs 1036, one or more computer readable program instructions 1038, and/or data, etc. The computer readable program instructions may be configured to carry out functions of embodiments of aspects of the invention.

Computer system 1002 may also communicate via, e.g., I/O interfaces 1008 with network interface 1032, which enables computer system 102 to communicate with one or more networks, such as a local area network (LAN), a general wide area network (WAN), and/or a public network (e.g., the Internet), providing communication with other computing devices or systems.

Computer system 1002 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 1002. Examples, include, but are not limited to: microcode or millicode, device drivers, redundant processing units, external disk drive arrays, RAID systems, tape drives, and data archival storage systems, etc.

Computer system 1002 may be operational with numerous other general-purpose or special-purpose computing system environments or configurations. Examples of well-known computing systems, environments, and/or configurations that may be suitable for use with computer system 1002 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 11A:
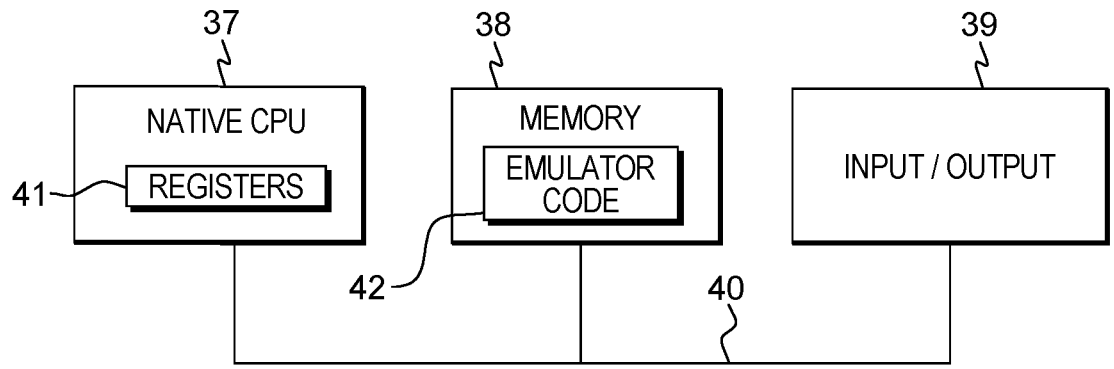
FIG. 11A depicts yet another example of a computing environment to incorporate and use one or more aspects of the present invention.

Another embodiment of a computing environment to incorporate and use one or more aspects of the present invention is described with reference to FIG. 11A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 11B:
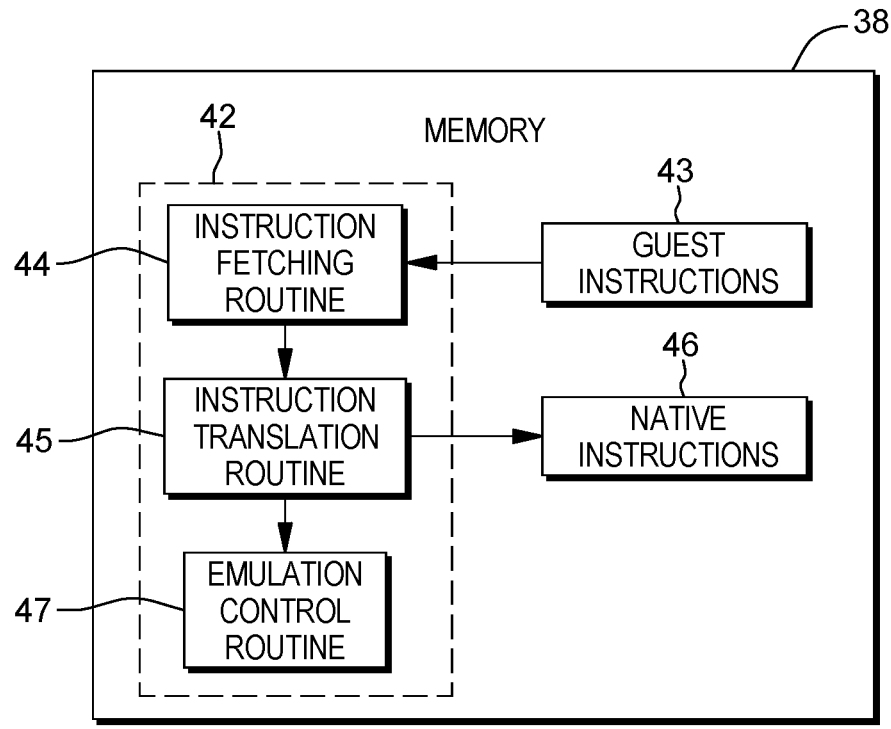
FIG. 11B depicts further details of the memory of FIG. 11A, in accordance with one or more aspects of the present invention.

Further details relating to emulator code 42 are described with reference to FIG. 11B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction or command that may be emulated includes the Diagnose instruction, the Read System Configuration Parameters command and/or a PC Call command described herein, in accordance with one or more aspects of the present invention. Further, other instructions, commands, functions, operations and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
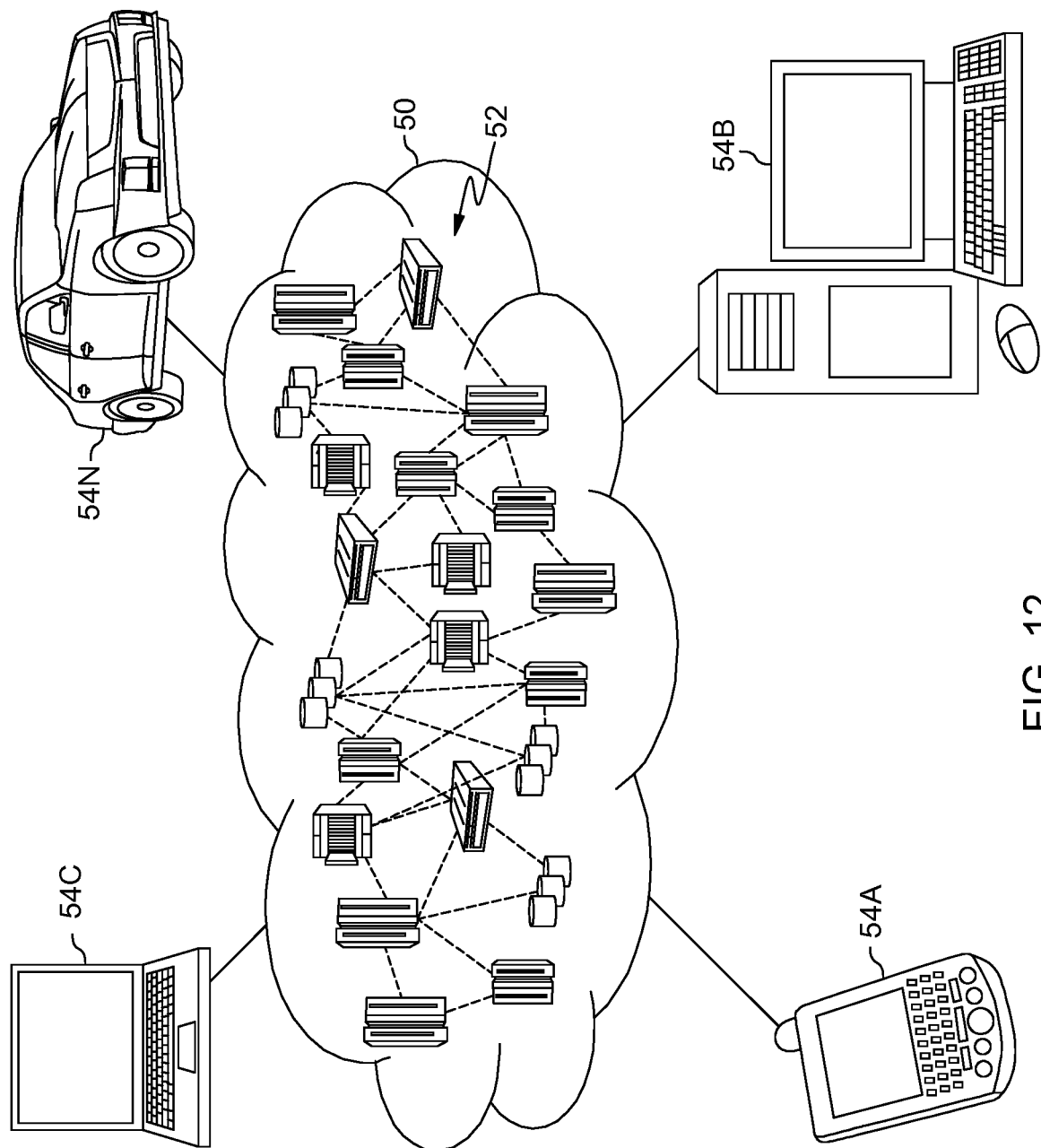
FIG. 12 depicts one embodiment of a cloud computing environment, in accordance with one or more aspects of the present invention.

Referring now to FIG. 12, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 13:
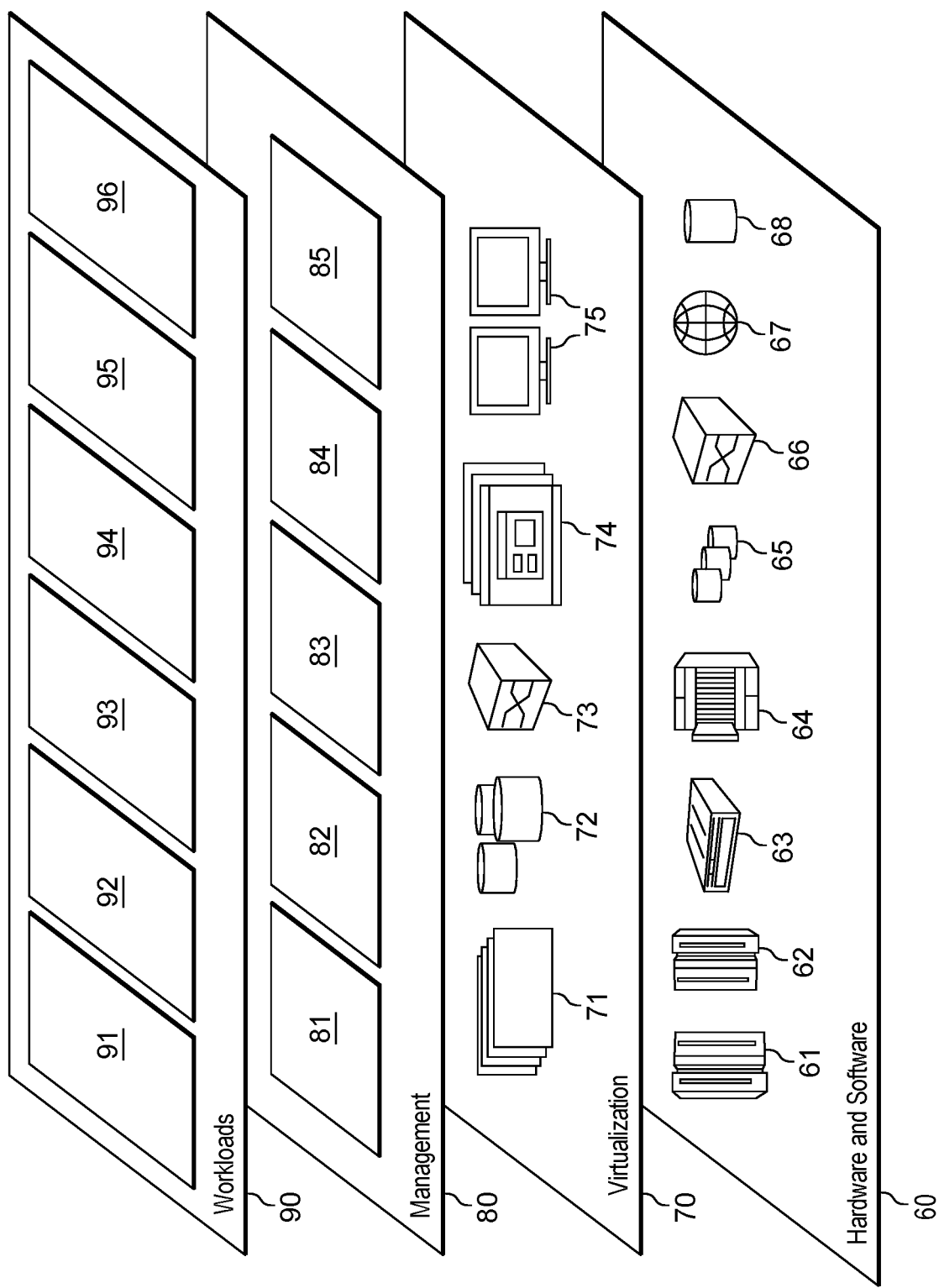
FIG. 13 depicts one example of abstraction model layers, in accordance with one or more aspects of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and boost query and/or update processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions and/or operations may be used. Additionally, different types of registers and/or different registers may be used. Further, other features and/or feature on demand structures may be supported. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer readable storage media and program instructions collectively stored on the one or more computer readable storage media to perform a method comprising:
        configuring at least one boost feature of the computing environment, the configuring at least one boost feature comprising one or more adjusted feature amounts obtained from on e of to adjust the at boost limits in effect;
        executing an instruction to perform a query operation to obtain information for a select entity of the computing environment, the information obtained by the query operation including an indication of how much out of a given amount of a boost feature of one or more boost features is remaining in a current time period for the select entity, the one or more boost features to be used to adjust, for a selected amount of time, one or more processing attributes of the select entity, wherein the one or more processing attributes include one or more characteristics relating to processing of the select entity;
        providing, based on executing the instruction and performing the query operation, the information obtained from performing the query operation in an information block, the information block being in an accessible location and including a plurality of fields related to the one or more boost features, the information block to be used to perform one or more actions to facilitate processing in the computing environment; and
        performing at least one action of the one or more actions to facilitate processing within the computing environment, the performing the at least one action comprising adjusting a processing attribute of the one or more processing attributes to improve processing of the select entity.

2. The computer program product of claim 1, wherein the select entity comprises a logical partition of the computing environment.

3. The computer program product of claim 1, wherein the select entity comprises a processor of the computing environment.

4. The computer program product of claim 1, wherein the one or more boost features include a total amount of speed boost time for the select entity and an amount of speed boost time remaining for the select entity, wherein the speed boost time comprises an amount of time of additional processor speed for use by the select entity.

5. The computer program product of claim 1, wherein the one or more boost features include a total amount of capacity boost time for the select entity and an amount of capacity boost time remaining for the select entity, wherein the capacity boost time comprises an amount of time of additional availability of one or more processors for use by the select entity.

6. The computer program product of claim 1, wherein the one or more boost features include a total amount of available boost cycles for the select entity and an amount of boost cycles remaining for the select entity, wherein a boost cycle comprises a number of boosts available over a defined period of time.

7. The computer program product of claim 1, wherein the one or more boost features include a time until refresh of at least one boost feature of the one or more boost features.

8. The computer program product of claim 1, wherein the information block comprises time until refresh short duration boost, remaining speed boost time, total speed boost time, remaining capacity boost time, total capacity boost time, time until refresh long duration boost cycles, total number of long duration boost cycles, and remaining number of long duration boost cycle.

9. The computer program product of claim 1, wherein a structure of the one or more structures provides an indication of an additional amount of a boost feature to be purchased or allocated for a select purpose, and an indication of an expiration period for the additional amount.

10. The computer program product of claim 1, wherein the adjusting the processing attribute comprises increasing processor speed for the select entity.

11. The computer program product of claim 1, wherein the adjusting the processing attribute comprises increasing processor capacity for the select entity.

12. A computer system for facilitating processing within a computing environment, the computer system comprising:
 a memory; and
 at least one processor in communication with the memory, wherein the computer system is configured to perform a method, said method comprising:
  configuring at least one boost feature of the computing environment, the configuring the at least one boost feature comprising using one or more adjusted feature amounts obtained from one or more structures to adjust the at least one boost feature, the one or more structures to override one or more boost limits in effect,
  executing an instruction to perform a query operation to obtain information for a select entity of the computing environment, the information obtained by the query operation including an indication of how much out of a given amount of a boost feature of one or more boost features is remaining in a current time period for the select entity, the one or more boost features to be used to adjust, for a selected amount of time, one or more processing attributes of the select entity, wherein the one or more processing attributes include one or more characteristics relating to processing of the select entity;
  providing, based on executing the instruction and performing the query operation, the information obtained from performing the query operation in an information block, the information block being in an accessible location and including a plurality of fields related to the one or more boost features the information block to be used to perform one or more actions to facilitate processing in the computing environment; and
  performing at least one action of the one or more actions to facilitate processing within the computing environment, the performing the at least one action comprising adjusting a processing attribute of the one or more processing attributes to improve processing of the select entity.

13. The computer system of claim 12, wherein the one or more boost features include a total amount of speed boost time for the select entity, an amount of speed boost time remaining for the select entity, a total amount of capacity boost time for the select entity and an amount of capacity boost time remaining for the select entity, wherein the speed boost time comprises an amount of time of additional processor speed for use by the select entity and the capacity boost time comprises an amount of time of additional availability of one or more processors for use by the select entity.

14. The computer system of claim 12, wherein the one or more boost features include a total amount of boost cycles available for the select entity and an amount of boost cycles remaining for the select entity, wherein a boost cycle comprises a number of boosts available over a defined period of time.

15. A computer-implemented method of facilitating processing within a computing environment, the computer-implemented method comprising:
 configuring at least one boost feature of the computing environment the configuring the at least one boost feature comprising using one or more adjusted feature amounts obtained from one or more structures to adjust the at least one boost feature, the one or more structures to override one or more boost limits in effect;
 executing an instruction to perform a query operation to obtain information for a select entity of the computing environment, the information obtained by the query operation including an indication of how much out of a given amount of a boost feature of one or more boost features is remaining in a current time period for the select entity, the one or more boost features to be used to adjust, for a selected amount of time, one or more processing attributes of the select entity, wherein the one or more processing attributes include one or more characteristics relating to processing of the select entity;
 providing, based on executing the instruction and performing the query operation, the information obtained from performing the query operation in an information block, the information block being in an accessible location and including a plurality of fields related to the one or more boost features, the information block to be used to perform one or more actions to facilitate processing in the computing environment; and
 performing at least one action of the one or more actions to facilitate processing within the computing environment, the performing the at least one action comprising adjusting a processing attribute of the one or more processing attributes to improve processing of the select entity.

16. The computer-implemented method of claim 15, wherein the one or more boost features include a total amount of speed boost time for the select entity, an amount of speed boost time remaining for the select entity, a total amount of capacity boost time for the select entity and an amount of capacity boost time remaining for the select entity, wherein the speed boost time comprises an amount of time of additional processor speed for use by the select entity and the capacity boost time comprises an amount of time of additional availability of one or more processors for use by the select entity.

17. The computer-implemented method of claim 15, wherein the one or more boost features include a total amount of boost cycles for the select entity and an amount of boost cycles remaining for the select entity, wherein a boost cycle comprises a number of boosts available over a defined period of time.

18. The computer-implemented method of claim 15, wherein the adjusting the processing attribute comprises increasing processor speed for the select entity.

19. The computer-implemented method of claim 15, wherein the adjusting the processing attribute comprises increasing processor capacity for the select entity.

20. A computer program product for facilitating processing within a computing environment, the computer program product comprising:
 one or more computer readable storage media and program instructions collectively stored on the one or more computer readable storage media to perform a method comprising:
  executing an instruction to perform a query operation to obtain information for a select entity of the computing environment, the information obtained by the query operation including an indication of how much of a boost feature of one or more boost features is currently available for the select entity, the one or more boost features to be used to adjust, for a selected amount of time, one or more processing attributes of the select entity, wherein the one or more processing attributes include one or more characteristics relating to processing of the select entity;

providing, based on executing the instruction and performing the query operation, the information obtained from performing the query operation in an information block, wherein the information block comprises time until refresh short duration boost, remaining speed boost time, total speed boost time, remaining capacity boost time, total capacity boost time, time until refresh long duration boost cycles, total number of long duration boost cycles, and remaining number of long duration boost cycles; and performing at least one action of the one or more actions to facilitate processing within the computing environment, the performing the at least one action comprising adjusting a processing attribute of the one or more processing attributes to improve processing of the select entity.

21. The computer program product of claim 20, wherein the adjusting the processing attribute comprises increasing processor speed for the select entity.

22. The computer program product of claim 20, wherein the adjusting the processing attribute comprises increasing processor capacity for the select entity.

23. A computer-implemented method comprising:

executing an instruction to perform a query operation to obtain information for a select entity of a computing environment, the information obtained by the query operation including an indication of how much of a boost feature of one or more boost features is currently available for the select entity, the one or more boost features to be used to adjust, for a selected amount of time, one or more processing attributes of the select entity, wherein the one or more processing attributes include one or more characteristics relating to processing of the select entity;

providing, based on executing the instruction and performing the query operation, the information obtained from performing the query operation in an information block, wherein the information block comprises time until refresh short duration boost, remaining speed boost time, total speed boost time, remaining capacity boost time, total capacity boost time, time until refresh long duration boost cycles, total number of long duration boost cycles, and remaining number of long duration boost cycles; and performing at least one action of the one or more actions to facilitate processing within the computing environment, the performing the at least one action comprising adjusting a processing attribute of the one or more processing attributes to improve processing of the select entity.

24. The computer-implemented method of claim 23, wherein the adjusting the processing attribute comprises increasing processor speed for the select entity.

25. The computer-implemented method of claim 23, wherein the adjusting the processing attribute comprises increasing processor capacity for the select entity.

* * * * *